T. Heermans,
Grain Ventilator,
Nº 40,261.
Patented Oct. 13, 1863.
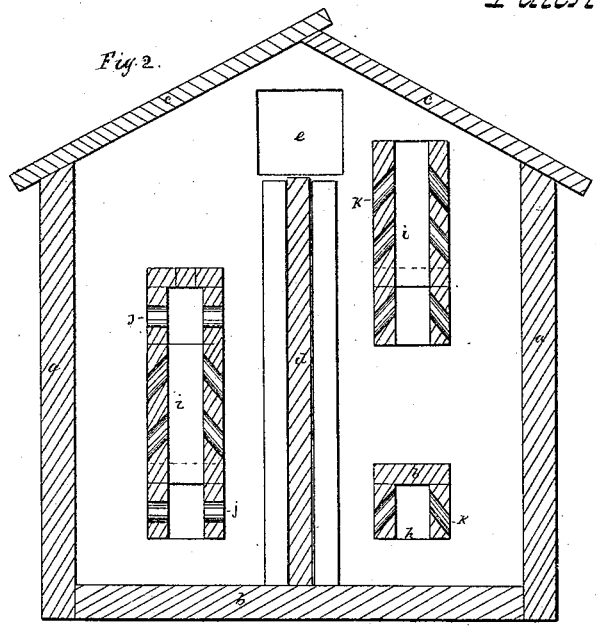
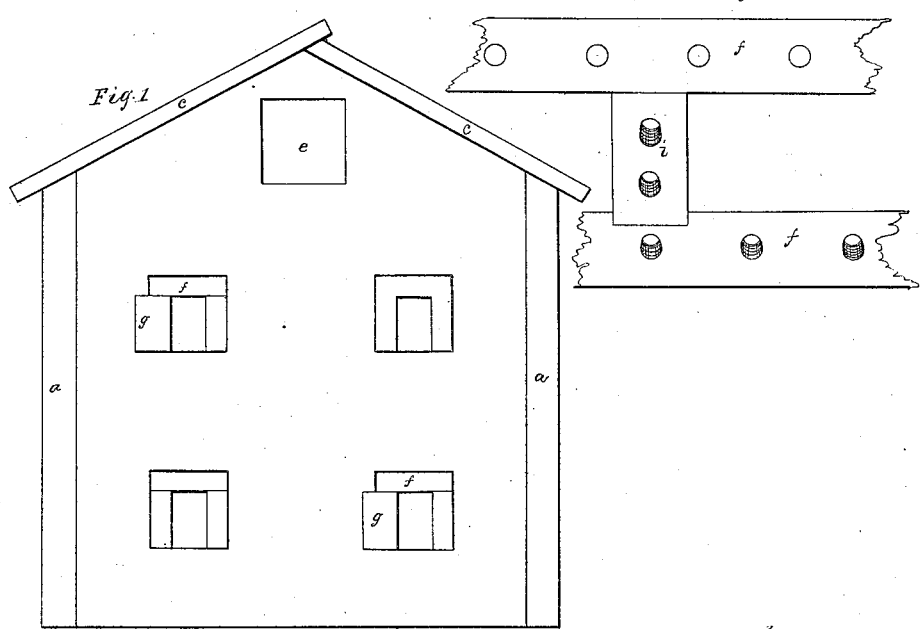
Witnesses
Inventor
T. Heermans

UNITED STATES PATENT OFFICE.

THEODORE HEERMANS, OF MITCHELLVILLE, TENNESSEE.

IMPROVEMENT IN GRANARIES.

Specification forming part of Letters Patent No. 40,261, dated October 13, 1863.

*To all whom it may concern:*

Be it known that I, THEODORE HEERMANS, of Mitchellville, in the county of Sumner and State of Tennessee, have invented a certain new and useful Improvement in Ventilating Granaries; and I do hereby declare that the following is a full, clear, and exact description thereof, reference being had to the accompanying drawings, and to the letters and marks thereon.

My invention has for its object the passing of atmospheric air into and through the bins or other chambers containing corn, wheat, or any other kind of grain, either relying upon the natural current of air, or by the use of blowers or other mechanical devices or means for a forced circulation of air, and thus giving a full and sufficient exposure of the grain to protect it against all the tendency to mildew, ferment, and other evil and injurious conditions that are apt to exist when grain in bulk or mass in not sufficiently exposed to pure and dry air or reasonable ventilation.

My improvement can be used in granaries already constructed, in storehouses, or any building in which it is desired to keep grain; or the improvement can be built up with the granary or storehouse being constructed.

The drawings forming part of this specification show my improvement applied to a granary, Figure 1 thereof being an end view of the granary; Fig. 2 a vertical section of the same, and Fig. 3 a view of the air troughs or tubes detached and shown only in part. In each of these figures where like parts are shown, like marks and letters are used to designate the parts.

The granary, having suitable sides $a$, floor $b$, roof $c$, partitions $d$, and holes $e$ for the insertion of troughs $f$, can be built of such dimensions or material as may be perferred. The openings or holes $e$ should be guarded by doors or shutters $g$, so that in stormy or bad weather the openings may be entirely closed, and also that such doors or shutters may regulate the amount of air passing into the troughs. These doors may be hinged, or may be sliding doors or shutters.

Instead of the troughs having their ends resting on the sides of the holes $e$ and being on line with the sides of the building or granary, and having the shutters or doors attached to them, the ends of the troughs may rest upon pieces secured to the inside of the granary, and so arranged that the troughs may be moved up or down, and thus be in line with the holes, or not, as may be required. I prefer that the ventilating-troughs for granaries should be horizontal, as they can be placed in the line so as to take advantage of the current of air or winds prevailing or more common at the season of the year when the grain is desired to be aired or dried— *i. e.*, if the location of the granary is where the winds are more frequently from the south or the north, the ends of the troughs will then be toward the south or north, and so for any other direction of the wind. The horizontal trough also allows of being placed through the entire length or width of the building, and of being readily placed at one horizontal line or another, of being moved up or down, and of easily being removed altogether.

The horizontal troughs $f$ have no fourth side or bottom, but are open, as shown at $h$. These troughs can be used with vertical troughs $i$ whenever desired, and the number of the one, $f$, or the other, $i$, and their particular arrangement and relation to each other and to the granary may be made as required for convenience or for the more perfect ventilation of the grain.

For corn, the holes $j$ in these troughs may be round or square and be in a horizontal line. For wheat and other like grains, I prefer that the holes shall be inclining from the sides upward, as shown at $k$. This inclining upward of the holes will prevent their being clogged, and the passage of the air thereby obstructed, as the grain will not enter into these holes or passages to such a degree or extent as to clog them.

A material advantage of the horizontal troughs arises from the allowance of their use when they are made without holes, as in such construction, in many instances, an ample quantity of air for all the purposes desired will pass out at the bottom and find its way in and among the grain.

It will be readily perceived that the means and the arrangement of these means herein described for ventilating granaries and drying grain will be very effectiv
that the current of air may
directed to that degree whi
safe and perfect keeping of the grain.

What I claim as new in ventilating granaries, and desire to secure by Letters Patent, is—

1. The horizontal troughs, without or with holes, constructed and used substantially as set forth.

2. In combination with the horizontal troughs, the vertical troughs, as described.

3. Inclining the holes or openings in the troughs upward and inward, as and for the purposes recited.

This specification signed this 19th day of September, 1863.

THEODORE HEERMANS.

Witnesses:
THOS. T. EVERETT,
DANL. ROWLAND.